Feb. 8, 1955 R. G. BROWNSTEIN 2,701,456
FLEXIBLE SHAFT COUPLING
Filed Feb. 7, 1950 3 Sheets-Sheet 1

Inventor
Raymond G. Brownstein
By Wilfred E. Lawson
Attorney

Feb. 8, 1955 — R. G. BROWNSTEIN — 2,701,456
FLEXIBLE SHAFT COUPLING
Filed Feb. 7, 1950 — 3 Sheets-Sheet 2
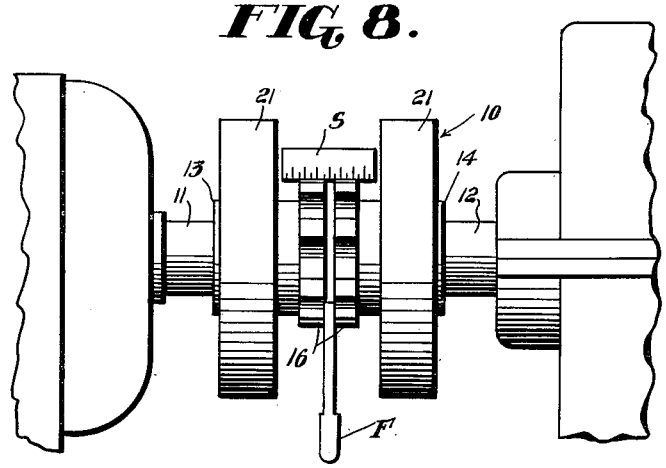
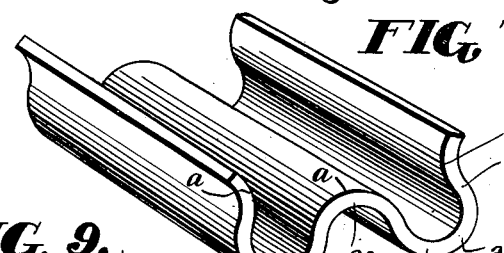
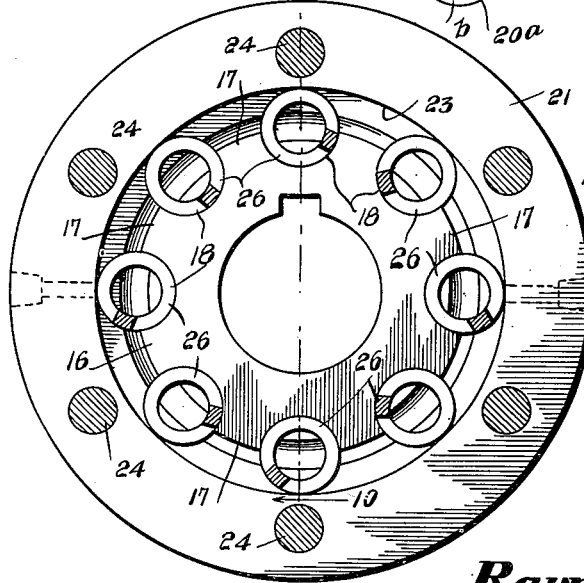
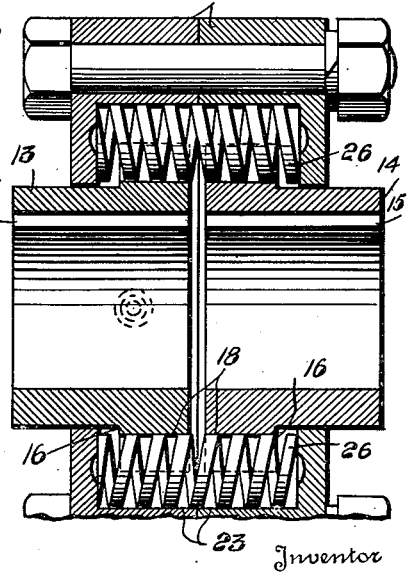
Inventor
Raymond G. Brownstein
By Wilfred Lawson
Attorney

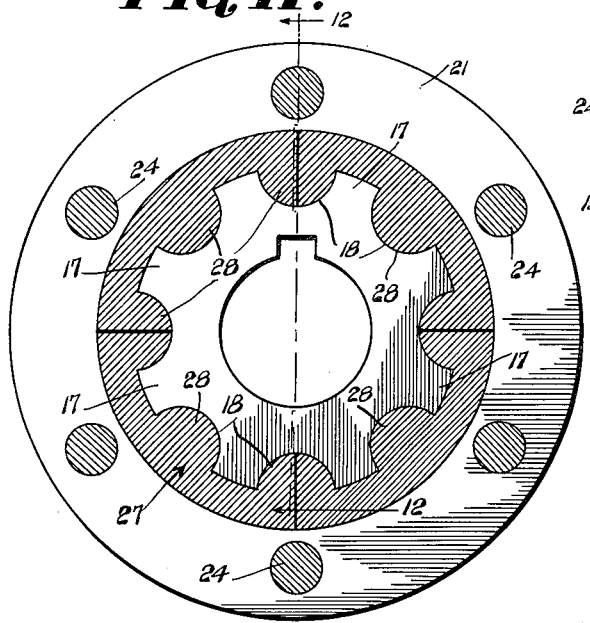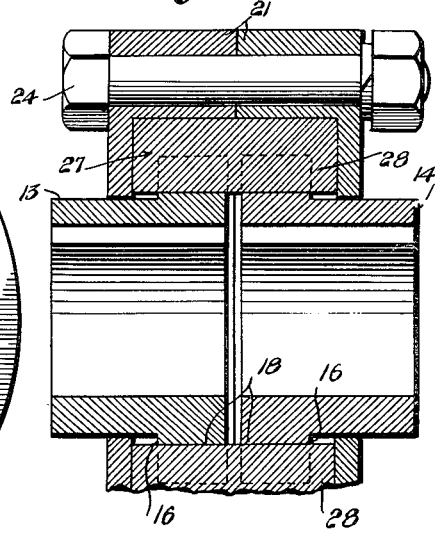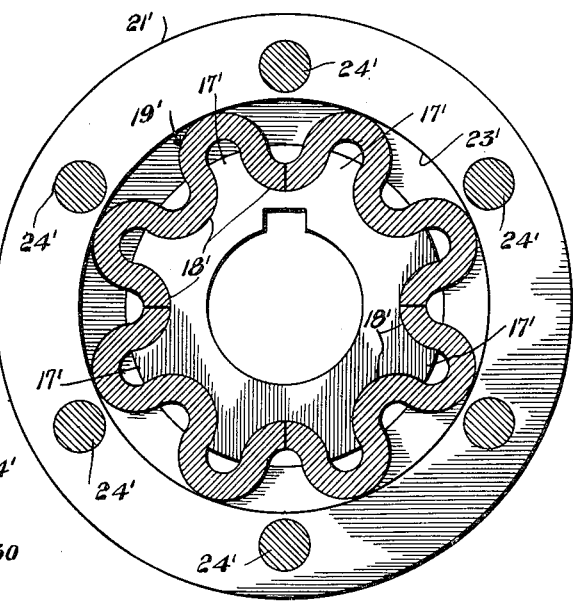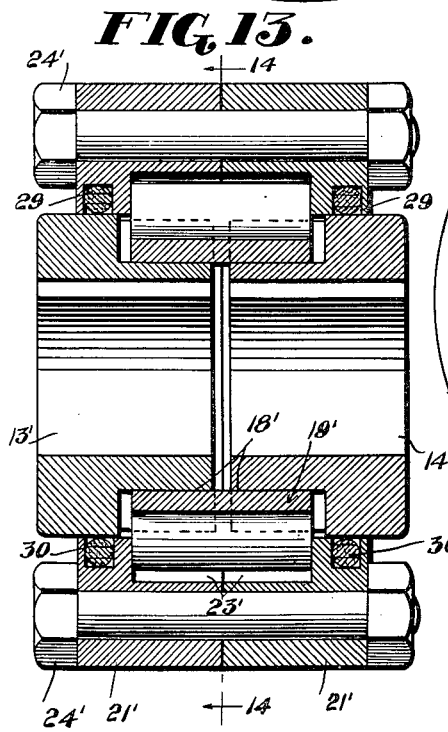

United States Patent Office 2,701,456
Patented Feb. 8, 1955

2,701,456

FLEXIBLE SHAFT COUPLING

Raymond G. Brownstein, Ellwood City, Pa.

Application February 7, 1950, Serial No. 142,879

2 Claims. (Cl. 64—15)

This invention relates to improvements in shaft couplings and is directed particularly to improvements in flexible couplings.

An object of the present invention is to provide an improved shaft coupling of a flexible character which provides a positive drive between the shafts, with free flexure of intermediate grid elements together with free end play without end thrust.

Another object of the invention is to provide a flexible shaft coupling which is of simple design and inexpensive to manufacture and which can meet a wide range of services by changing only the yieldable or flexible part of the coupling.

Another object of the invention is to provide an improved flexible shaft coupling which will function successfully under conditions of misalignment of the coupled shafts.

A still further object of the invention is to provide an improved flexible shaft coupling which may be employed as a means of accurately aligning the shafts and machines to be coupled so that in assembling the coupling between two opposing shaft ends, the accurate disposition of opposing and cooperating parts of the coupling will bring the shafts which are being coupled together into parallel, coaxial relation.

Other objects and advantages of the present invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 7 is a perspective view of one section of the four section or four part grid shown in Figure 3;

Figure 8 is a view illustrating the partially assembled coupling between two machines and showing the manner of squaring up and aligning the machine shafts;

Figure 9 is a central transverse section through another embodiment of the invention;

Figure 10 is a partial longitudinal section taken substantially on the line 10—10 of Figure 9;

Figure 11 is a central transverse section through a third embodiment of the invention;

Figure 12 is a partial transverse section taken substantially on the line 12—12 of Figure 11;

Figure 13 is a central longitudinal section through a fourth embodiment of the invention;

Figure 14 is a transverse section taken upon the line 14—14 of Figure 13.

Figure 1:
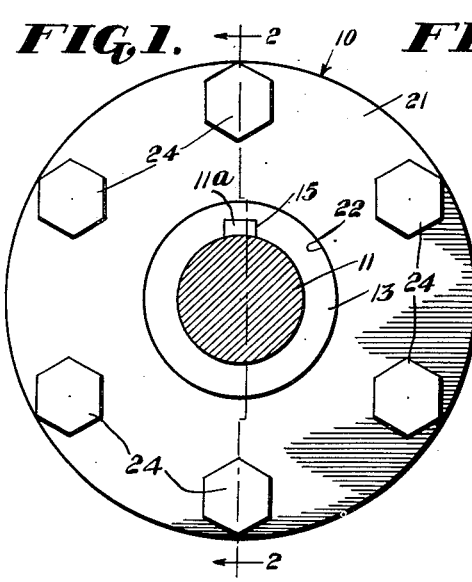
Figure 1 is a view in end elevation of a flexible coupling constructed in accordance with one embodiment of the present invention, the shaft being in transverse section.

Referring more particularly to the drawings the numeral 10 generally designates a coupling constructed in accordance with the present invention and joining together two shafts 11 and 12, one of which represents a drive shaft and the other a driven shaft.

The coupling comprises two shaft collars or sleeves designated 13 and 14, each of which is designed to be secured upon the end of a shaft as shown and each collar has a keyway 15 for facilitating the coupling of the collar with the shaft. While separate reference characters are given to the collars, nevertheless they are of duplicate construction as will be readily apparent.

Figure 2:
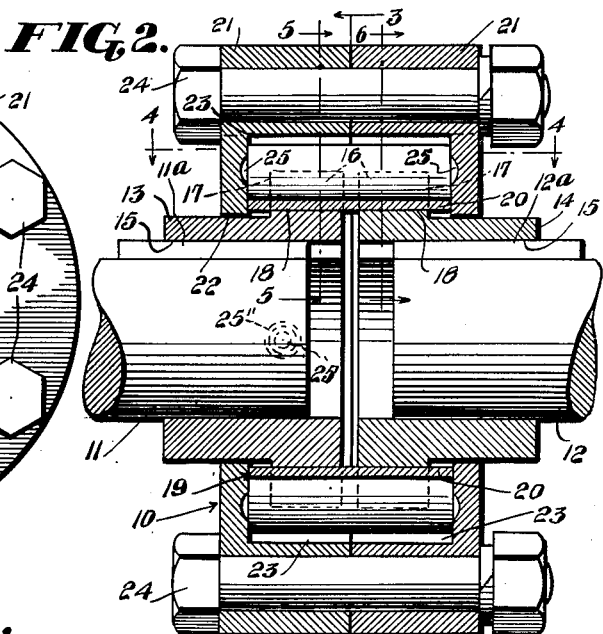
Figure 2 is a sectional view taken substantially on the line 2—2 of Figure 1.
Figure 3:
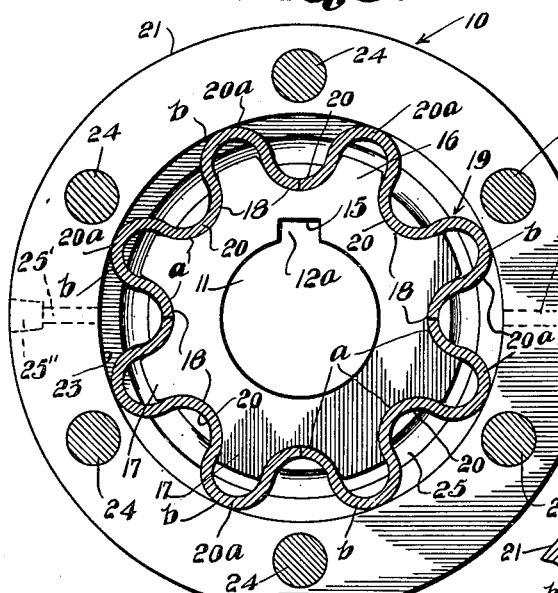
Figure 3 is a transverse section taken on the line 3—3 of Figure 2.

Each of the collars 13—14 has a circumferentially enlarged sprocket head 16 at one end, which head comprises the spaced sprocket teeth 17 as shown in Figure 2. As is also shown, the gullets 18 between the sprocket teeth are formed on a circular arc and the length of the teeth 17 is such that they do not extend beyond the center of the circle which determines the tooth space or gullet 18.

The end faces of the collars 13—14 at the head ends or toothed ends thereof, are square with the axis of the collar so that when the collars are brought into opposed relation as in the coupling of the two shafts, if these opposing end faces are placed in parallel relation the radially directed end faces of the sprocket teeth of one collar will be parallel with the faces of the teeth of the other collar.

The sprocket like ends of the collars are joined or coupled together by a cylindrical grid which is generally designated 19 and which is preferably divided longitudinally into four quarters. This cylindrical grid is longitudinally fluted as shown, each flute or groove being designated 20 and as shown each flute has a substantially semicircular face $a$, in transverse section, which corresponds with the curvature of the gullet 18 between two teeth 17, in which gullet the fluted portion lies.

Between the flutes or grooves 20 the radially outwardly extending rib portions 20a have a substantially semicircular transverse curvature as indicated at $b$ and the center of this curvature lies, when the grid is in position, in the plane of the outer end face of the tooth over which the rib lies.

It will be seen that the grid sections form flexible connecting members which seat, in the nature of a sprocket chain, in the teeth or between the teeth of the driving and driven shaft collars. While the flexible grid unit may be formed in any desired number of sections, it is found that a unit of four sections is most desirable.

The length of the flexible grid is such that when it is in position to connect together the sprocket like heads of the collars, it will extend as each end beyond the heads, as shown in Figure 2. Thus it will be apparent that the collars can have some endwise movement or play within the longitudinal dimensions of the grid.

The grid and the toothed ends of the collars, are housed within a cage which comprises two circular plates 21 having a central opening 22 to snugly receive a collar as shown. Each of these plates has a face cut out to form a recess 23, of circular form and these recesses when brought together by the assembling of the plates in the manner shown, provide a chamber in which is housed the flexible grid and the sprocket like heads of the collars.

The cage plates are secured together by bolts 24 which draw the opposing faces tightly together and it will be seen that when the cage is set up the length of the grid chamber is such as to snugly receive the grid therein and the radius of the chamber is such that when the flutes 20 of the grid are seated in the gullets between the teeth 17, the curved or rounded outer portions of the ribs 20a will be in contact with the radial wall of the grid chamber.

Each of the axial walls of the grid chamber is provided with the annular lubricant channel 25 and each plate is provided with the radially directed grease passage 25' which opens into the recess 23 and which at its outer end is pipe tapped as indicated at 25" to receive a pipe plug, not shown. By this means grease may be forced into the chamber formed by the recesses 23, to be distributed therethrough along the channels 25.

The distance from the center line of the tooth space or gullet arc to the inner radial surface of the cage is equal to the radius of the tooth space or gutlet arc. Because of this the fluted grid cylinder sections may be replaced with other forms of grids or coupling elements lying in the spaces between the teeth of the two collars, without changing the entire coupling, thereby extending the ability of the coupling to serve a wide range of loads and services, without change of design or manufacturing set-up.

The maintenance of the grid, by the cage, in axial alignment allows grid action with free end play and no end thrust because the grid cannot become twisted at an angle with the axis to set up an axial load component. The space between the ends of the teeth 17 and the inner radial surface of the cage chamber, allows space for flexure of the grid, as a result of which the coupling allows positive drive, with free grid flexure and free end play without end thrust.

In setting up or installing the flexible coupling, the cage plates 21 are first each slipped onto a shaft before the coupling collars 13—14 are placed thereon. The collars are then placed on the shafts and secured by suitable keys 11a, 12a, after which the shafts are moved into aligned relation.

The coupling may be used as a means of accurately aligning the shafts, as well as the machines which are to be coupled, for which purpose the teeth of the two coupling collars or sleeves must have flat tops and the diameters must be the same to close tolerance. By laying a scale on the flat tops of the teeth as indicated at S in Figure 8, and at 90° from this position, parallel alignment of the shafts may be obtained. For aiding in squaring the machines with each other and eliminating angular misalignment, a feeler gauge F may be inserted between the opposing faces of the coupling collars as illustrated. The plates 21 will, of course, be moved back away from the tooth heads of the collars during this operation and after the shafts have been properly aligned, the sections of the flexible grid are placed in position across the teeth of the two collars and the plates 21 are then moved together so as to enclose the grid in the chamber formed by the co-operating recesses 23, after which the bolts 24 are applied and drawn tight.

Figures 5, 6:
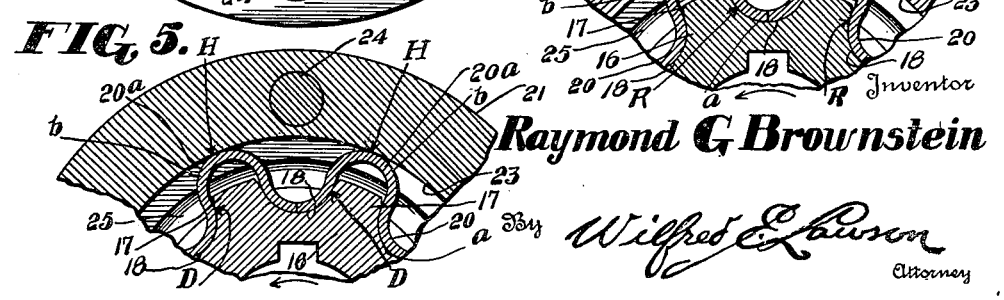
Figure 5 is a partial section taken substantially on the line 5—5 of Figure 2 looking in the direction of the arrows.
Figure 6 is a partial section taken substantially on the line 6—6 of Figure 2, looking in the direction of the arrows.

In the operation of the flexible coupling as described and in the modified embodiments hereinafter set forth the driving force from one collar such, for example, as the collar 13 is exerted upon the spring grid 19 in the direction indicated by the arrow at D in Figure 5.

The reacting force from the driven member, here designated the collar 14, resisting rotation, is exerted against the spring grid in the direction indicated by the arrow at R.

The reacting force of the load or cage plates 21 exerted on the spring grids or sections of the grid 19 to counteract the outward radial component of forces D and R is applied in the direction of the arrow designated H. This force H is therefore a radial spring grid retaining force.

Figure 4:
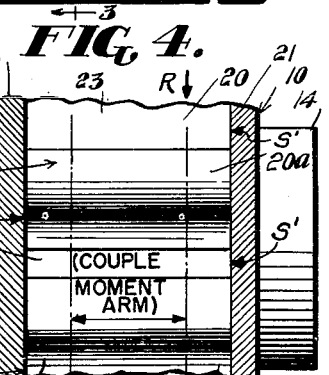
Figure 4 is a partial section taken substantially on the line 4—4 of Figure 2.

The reacting force of the load or cage plates 21 exerted against force couple set up by forces D and R in action is applied in the direction indicated by the arrows at S' in Figure 4. This reacting force couple S' acts in a transverse direction against the sides of the grid sections and is, therefore, a transverse grid aligning force. Since the grids are retained in a transverse direction they are axially aligned with the toothed collars and free end play without end thrust is the result.

The force path is, in the light of the foregoing, from the driving member or collar 13, through the load or cage plates 21 and spring grid sections 19 to the driven member or collar 14.

As above stated the design of the coupling structure is such that the grid 19 may be replaced with other forms without changing the collars and the cage plates and Figures 9 to 10 illustrate such another form wherein, in place of the longitudinally fluted sectional cylindrical grid, helical springs 26 are placed in the gullets 18 between the teeth 17. The outside radius of the springs is the same as the radius of the circle forming the gullet between a pair of teeth and accordingly it will be seen that the springs will contact at their outer sides, the radial faces of the recesses 23.

Figures 11 and 12 illustrate still another embodiment in which the grid which replaces the fluted grid 19, is in the form of a cylinder 27, divided into a number of sections, here shown as four.

The outside diameter is the same as the diameter of the cage chamber and the inside surface of this solid grid cylinder is formed with a plurality of equidistantly spaced, parallel longitudinal ribs 28 of substantially semi-circular cross section. As in the case of the springs 26 and the flutes or grooves of the grid 19, the radius of each rib 28 corresponds to the radius of the circular arc forming the gullet 18 between the teeth so that the space from the bottom to the gullet to the radial wall of the cage chamber is completely filled.

Figures 13 to 14 illustrate a further embodiment of the invention wherein the teeth with which the grid unit connects, are milled in or recessed in the shaft carried collar instead of projecting outwardly from the side thereof as in the case of the collars 13 and 14.

In this construction the collars are designated 13' and 14'. These are milled out at one end to form the teeth 17' with the arcuate gullets 18' therebetween being recessed in the body of the collars below the outer side face thereof. Accordingly it will be seen that the overall diameter of each collar is the same from one end to the other so that the teeth do not project beyond the circumferential line of the outer wall of the collar.

The cage for this recessed tooth form of the coupling, comprises the two plates 21', each of which has a recess cut in one face thereof as indicated at 23'. It will be seen, however, that the recesses in the plates 21' are of less radial extent than the recesses 23 since the chamber formed between the plates does not have to have the additional depth required in the first described form of the invention to receive the projecting teeth 17. In this form of the invention, however, it is necessary to provide the inner surface of each cage plate, adjacent to the recess 23', with a grease seal channel 29, in which is fitted a packing 30. This construction prevents the seepage of the lubricant out around the collars 13'—14' as will be readily apparent.

In the construction shown in the last mentioned embodiment, the grid structure is generally designated 19' and is of substantially the same form as the previously described grid 19. The part of the grid cylinder forming the outwardly opening channels seats in the gullets between the teeth 17' while the rib forming portions between the flutes, project beyond the outside circumference of the collars and contacts the outer radial wall of the chamber formed by the recesses 23'.

It is also pointed out that in this latter embodiment the length of the fluted grid cylinder 19' is materially less than the combined lengths of any two aligned gullets 18', as a result of which required endwise movement of the collars 13'—14', may take place within prescribed limits, without interference by the grid unit.

As in the previously described structure the cage plates 21' are coupled together by bolts 24' which pass through suitable openings paralleling the axis of the coupling.

From the foregoing it will be apparent that there is provided in the present coupling structure, a means for establishing a positive but flexible coupling between a pair of shafts, wherein the novel design is such as to permit the easy exchange or replacement of the grids between the coupled collars whereby the character of the coupling may be altered to serve a wide range of loads and service.

Also of importance in the present flexible coupling is the arrangement wherein the cage snugly receives the grid member and holds it in axial alignment and radial position.

I claim:

1. A flexible yieldable shaft coupling for connecting driving and driven shafts disposed in approximate alignment, said coupling comprising opposed annular toothed elements, means for securing one element to the driving shaft and the other element to the driven shaft, the surface between adjacent teeth of each element being substantially semi-circular in formation, the height of each tooth being substantially equal to the radius of an arc defining said semicircular surface, a plurality of longitudinally corrugated sheet metal coupling members disposed in intermeshing engagement with the teeth of said elements and together forming a complete circle, each coupling member being approximately ninety degrees in length whereby a coupling member may be removed or replaced radially of said elements, the depth of said corrugations being approximately twice the height of said teeth whereby upon the application of torque to said driven shaft said members may yield circumferentially and means for retaining said members in engagement with said teeth comprising a two part cage, each part having an inwardly extending flange engaging the ends of said members and said teeth and an annular inner surface engaging the outer corrugations of said members and fastening means extending through said parts for retaining the same in assembled relationship on said coupling.

2. A flexible yieldable shaft coupling for connecting driving and driven shafts disposed in approximate alignment, said coupling comprising opposed annular toothed elements, means for securing one element to the driving shaft and the other element to the driven shaft, the surface between adjacent teeth of each element being substantially semicircular in formation, the height of each tooth being substantially equal to the radius of an arc defining said semicircular surface, a plurality of longitudinally corrugated sheet metal coupling members disposed in intermeshing engagement with the teeth of said elements and together forming a complete circle, the depth of said corrugations being approximately twice the height of said teeth whereby upon the application of torque to said driven shaft said members may yield circumferentially and means for retaining said members in engagement with said teeth comprising a two part cage, each part having an inwardly extending flange engaging the ends of said members and said teeth and an annular inner surface engaging the outer corrugations of said members and fastening means extending through said parts for retaining the same in assembled relationship on said coupling.

References Cited in the file of this patent

UNITED STATES PATENTS

| 1,435,141 | Serrell | Nov. 7, 1922 |
| 1,868,544 | Serrell | July 26, 1932 |
| 1,979,306 | Banner | Nov. 6, 1934 |
| 2,332,068 | Fast | Oct. 19, 1943 |
| 2,479,278 | Tessendorf et al. | Aug. 16, 1949 |

FOREIGN PATENTS

| 564,415 | France | Dec. 29, 1923 |